United States Patent
Weiblen (10) Patent No.: US 12,356,120 B2
(45) Date of Patent: Jul. 8, 2025

(54) DIGITAL MIRROR FIELD OF VIEW AUTOMATIC ADJUSTMENT

(71) Applicant: PACCAR INC, Bellevue, WA (US)

(72) Inventor: Anthony Weiblen, Highland Village, TX (US)

(73) Assignee: PACCAR Inc, Bellevue, WA (US)

( * ) Notice: Subject to any disclaimer, the term of this patent is extended or adjusted under 35 U.S.C. 154(b) by 96 days.

(21) Appl. No.: 18/053,122

(22) Filed: Nov. 7, 2022

(65) Prior Publication Data

US 2024/0155078 A1 May 9, 2024

(51) Int. Cl.
| | |
|---|---|
| *H04N 7/18* | (2006.01) |
| *G06F 3/01* | (2006.01) |
| *G06T 7/70* | (2017.01) |
| *H04N 5/262* | (2006.01) |
| *H04N 23/69* | (2023.01) |
| *H04N 23/695* | (2023.01) |

(52) U.S. Cl.
CPC ............ *H04N 7/181* (2013.01); *G06F 3/011* (2013.01); *G06T 7/70* (2017.01); *H04N 5/2628* (2013.01); *H04N 23/69* (2023.01); *H04N 23/695* (2023.01); *G06T 2207/30201* (2013.01); *G06T 2207/30268* (2013.01)

(58) Field of Classification Search
CPC ...... H04N 7/181; H04N 5/2628; H04N 23/69; H04N 23/695; H04N 23/62; G06F 3/011; G06T 7/70; G06T 2207/30201; G06T 2207/30268; B60R 1/26; B60R 2300/105; B60R 2300/60; B60R 2300/70; B60R 2300/8046; G02B 27/0093
USPC ......................................................... 348/148
See application file for complete search history.

(56) References Cited

U.S. PATENT DOCUMENTS

| | | | | |
|---|---|---|---|---|
| 2021/0387573 | A1* | 12/2021 | Hinson | ................. B60W 50/14 |
| 2022/0083794 | A1* | 3/2022 | Bronte | ..................... B60R 11/04 |
| 2022/0161720 | A1* | 5/2022 | Fürsich | .................. H04N 7/181 |

* cited by examiner

*Primary Examiner* — Christopher S Kelley
*Assistant Examiner* — Ana Picon-Feliciano (57) ABSTRACT

Systems and methods for determining a position of a vehicle driver and adjusting one or more digital mirrors based on the determined position. According to examples, the position of the driver's eyes and/or head are sensed by one or more driver position sensors and determined by a driver position processor. An external camera captures images external to the vehicle, and a video processor crops, zooms, pans, and/or otherwise adjusts the images to be displayed based on the position of the driver's eyes and/or head.

12 Claims, 7 Drawing Sheets

DIGITAL MIRROR FIELD OF VIEW AUTOMATIC ADJUSTMENT

BACKGROUND

Digital mirrors are increasingly being incorporated into vehicles over traditional reflective glass mirrors due to a range of benefits they provide. For instance, in addition to providing increased safety (e.g., reducing or eliminating blind spots, showing more detail in dark places or in inclement weather), the use of digital mirrors further improves fuel economy on internal combustion vehicles or increases the battery usage range of electric vehicles due in part, for example, to aerodynamics.

While relatively specific examples have been discussed, it should be understood that aspects of the present disclosure should not be limited to solving the specific examples identified in the background.

SUMMARY

The disclosure generally relates to automatically adjusting a field of view on a digital mirror based on driver position according to examples.

In some examples, a method is provided, comprising: obtaining images of an area exterior a vehicle having a captured field of view (FOV); detecting a current position of a driver of the vehicle, wherein the current position comprises a first position; determining a first displayed FOV at which to display the images based on the first position; and displaying the first displayed FOV of the images on a digital mirror display, wherein the first displayed FOV is a portion of the captured FOV.

In some examples, an auto-adjusting field of view (FOV) digital mirror system is provided, comprising: at least one processor; and a memory including instructions, which when executed by the processor, cause the system to: obtain images of an area exterior a vehicle having a captured field of view (FOV); detect a current position of a driver of the vehicle, wherein the current position comprises a first position; determine a first displayed FOV at which to display the images based on the first position; and display the first displayed FOV of the images on a digital mirror display, wherein the first displayed FOV is a portion of the captured FOV.

In some examples, a vehicle is provided, comprising an auto-adjusting field of view (FOV) digital mirror system, comprising: at least one processor; and a memory including instructions, which when executed by the processor, cause the system to: obtain images of an area exterior a vehicle having a captured field of view (FOV); detect a current position of a driver of the vehicle, wherein the current position comprises a first position; determine a first displayed FOV at which to display the images based on the first position; and display the first displayed FOV of the images on a digital mirror display, wherein the first displayed FOV is a portion of the captured FOV.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following FIGURES.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

As mentioned above, digital mirrors are increasingly being incorporated into vehicles over traditional reflective glass mirrors due to a range of benefits they provide. For instance, in addition to providing increased safety (e.g., reducing or eliminating blind spots, showing more detail in dark places or in inclement weather), the use of digital mirrors further improves fuel economy on internal combustion vehicles or increases the battery usage range of electric vehicles due in part, for example, to aerodynamics. One shortcoming of current digital mirrors is that the display of a corresponding camera's field of view does not change relative to movement of a driver's eye or head position. This, for example, can feel unnatural to the driver in comparison to traditional reflective mirrors and limit drivers' willingness to adopt digital mirrors.

Accordingly, aspects of the present disclosure provide systems and methods for determining a position of a vehicle driver and adjusting one or more digital mirrors based on the determined position. According to examples, the position of the driver's eyes and/or head may be sensed by one or more driver position sensor(s) and determined by one or more driver position processor(s). One or more external cameras capture images (e.g., frames of a video) external to the vehicle, and one or more video processor crops, zooms, pans, and/or otherwise adjusts the video frames (herein referred to generally as video) to be displayed based on the position of the driver's eyes and/or head. These and other examples are discussed below with reference to FIGS. 1-5.

Figure 1:
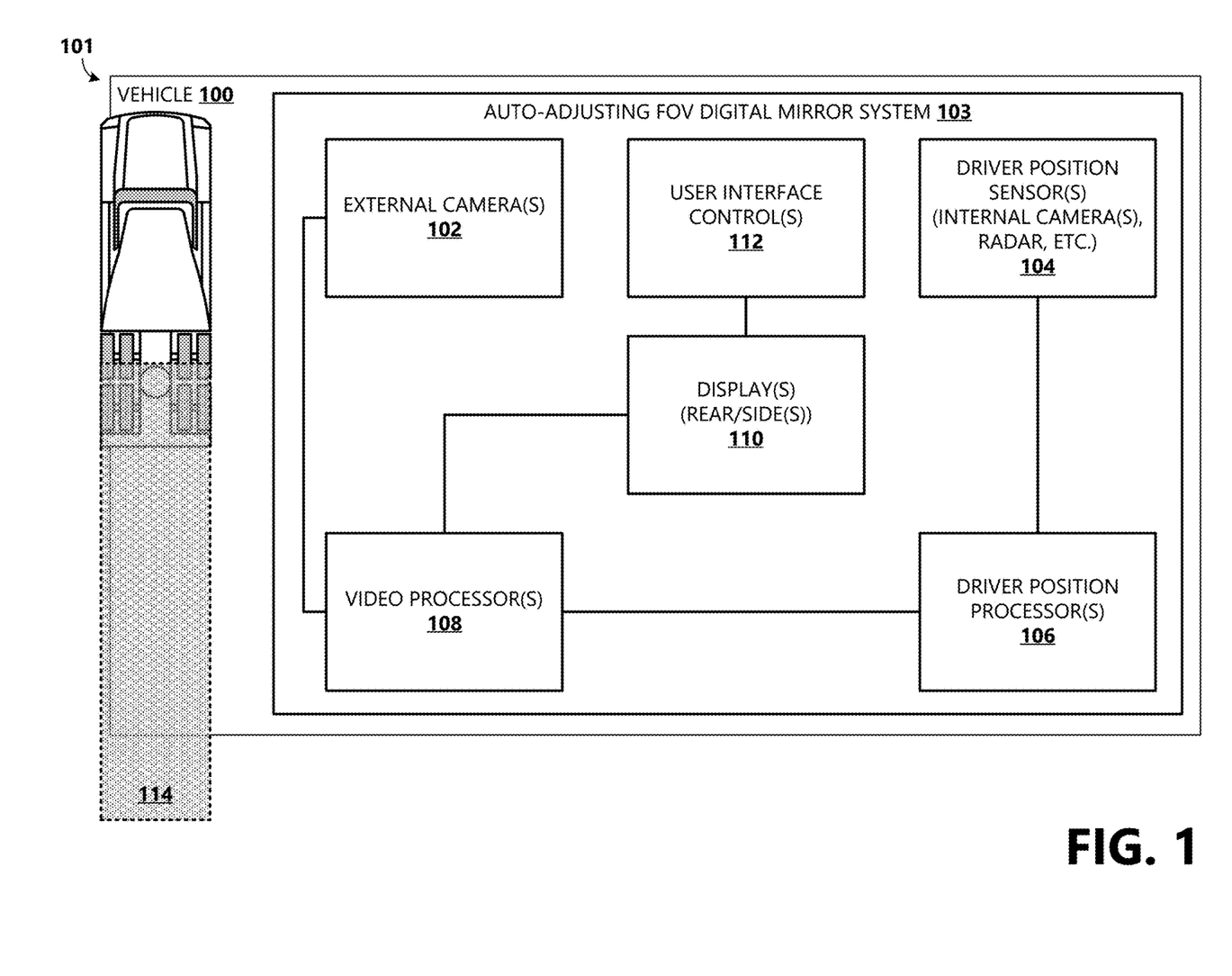
FIG. 1 is a block diagram illustrating an operating environment in which aspects of an auto-adjusting field of view digital mirror system may be implemented according to an example.

FIG. 1 is a block diagram illustrating an example operating environment 101 in which an auto-adjusting field of view (FOV) digital mirror system 103 may be implemented. With reference now to FIG. 1, the example operating environment 101 includes a vehicle 100. In some examples, the vehicle 100 is a truck, such as Class 8 truck where, for example, it is known that a driver's view in a tractor-trailer combination is very limited when changing lanes or backing up due to the presence of occluding vehicle objects, such as the semi-trailer 114, a sleeper cab, if equipped, other cab structure (e.g., an A, B, and/or C pillar, combinations thereof), etc. However, the methods and systems described herein can be used by vehicles of all types and sizes. It will be appreciated that aspects of the disclosed subject matter may also have wide application and, therefore, may be suitable for use with any type of vehicle, such as passenger vehicles, buses, light, medium, and heavy-duty vehicles, boats, yachts, motor homes, trains, planes, etc. While examples are depicted in the FIGURES as a tractor (e.g., truck/vehicle 100) and trailer 114, the embodiments may be applied to any vehicle. Accordingly, the following descriptions and illustrations herein should be considered illustrative in nature and, thus, not limiting the scope of the claimed subject matter.

In some examples, and as depicted in FIG. 1, the auto-adjusting FOV digital mirror system 103 includes one or more external cameras 102, one or more driver position sensors 104, one or more driver position processors 106, one or more video processors 108, one or more displays 110, and one or more user interface (UI) controls 112. The one or more external cameras 102 are configured to capture images of one or more areas external to the vehicle 100. For instance, the captured images (which may take the form of frames of a video stream) may include areas that may normally be reflected in one or more reflective mirrors included in the vehicle 100, such as side view mirrors and/or, in some examples, a rearview mirror. In some examples, the external cameras 102 are located at least in part on the vehicle's exterior. As an example, an external camera 102 configured to capture images that may normally be reflected in a side view mirror may be attached to an A-pillar or door of the vehicle 100, above the door, or otherwise proximate to where the side view mirror may normally be attached to the vehicle 100. As another example, an external camera 102 configured to capture images that may normally be reflected in a rearview mirror may be attached to a root trunk, trailer 114, cargo area, or other rear-side surface of the vehicle 100. Other external camera 102 locations are possible and are within the scope of the present disclosure. Images captured by the external cameras 102 may be transmitted (via wired or wireless connection(s)) to the one or more video processors 108 for display on one or more displays 110. In some examples, each external camera 102 is paired with a corresponding video processor(s) 108. In other examples, multiple external cameras 102 may be paired with a video processor(s) 108.

In some examples, the displays 110 are located in the vehicle's interior. For instance, two displays 110 may be located proximate to where traditional side view reflective mirrors would be located (e.g., on or near the vehicle's A-pillars). In some examples, a display 110 may alternatively or additionally be located proximate to where a traditional rearview reflective mirror would be located for a passenger car (e.g., proximate to top-center of the vehicle's windshield). In some examples, other displays 110 may be included. For instance, one or more displays 110 may be integrated into a dashboard or another component of the vehicle 100.

The one or more driver position sensors 104 may include one or more internal cameras, radar sensors, or other type of sensors operative to sense position, shape, motion characteristics, and/or motion trajectory (herein referred to generally as position) of a driver of the vehicle 100. In some examples, the driver position sensor(s) 104 are configured to detect a position corresponding to the driver's head, eyes, or another anatomical feature of the driver. For example, a detected position of a midpoint between the driver's eyes or of the driver's head may be used as the position of the driver. In some examples, the driver position sensor(s) 104 are located at least in part on the vehicle's interior, such as proximate to where a traditional rearview reflective mirror would be located (e.g., proximate to top-center of the vehicle's windshield), attached or proximate to a dashboard of the vehicle 100, or other internal location where the driver's position can be observed by the sensor(s). The one or more driver position sensors 104 may transmit driver position information to the one or more driver position processors 106.

The driver position processor(s) 106 and/or video processor(s) 108 may evaluate driver position information received from the driver position sensor(s) 104 and determine the position of the driver relative to a display 110 (or multiple displays 110) and whether the driver's position (e.g., distance and angle) has moved relative to a display 110. In some examples, the driver position processor(s) 106 and/or video processor(s) 108 may determine whether the driver's current position has moved from a previous position or from a preconfigured setpoint by more than a threshold distance or angle. For example, the driver may move their head or eyes toward a display 110, away from a display 110, left, right, up, and/or down in relation to a display 110. Accordingly, the driver position sensor(s) 104 may obtain images or other driver position information associated with the driver's movement, and the driver position processor 106 may process the driver position information to determine a current driver position relative to a previous position and/or relative to the display 110. In some examples, the driver position processor(s) 106 may be configured to determine whether driver position information indicates the driver has moved their head by a distance and/or angle closer, farther, to the left, to the right, upward, downward, or a combination of one or more in relation to the display 110. In some examples, the driver position processor(s) 106 may determine only the position of the driver and report it periodically (or upon some detecting movement beyond a minimum threshold) to the video processor 108, and the video processor 108 may make a determination of whether and how much the driver's position has moved relative to the display 110.

Different methods for determining a position of a display 110 may be used for calculating the change of distance and/or angle of the driver's position relative to the display 110. For instance, the determination is made based on a change in distance or angle between the driver's eyes or head and a geometric center of an outer surface of the display 110. Although the display 110 may not be perfectly planar, the angle may be calculated based on the angle between a driver position point (e.g., between eyes/center of head, etc.) and a display plane (e.g., an assumed plane of the display 110 that includes the midpoint of the display and is tangential to that point at the outer surface of the display 110. Other mechanisms for defining a driver position point and/or the display plane are possible and contemplated by the current disclosure. In examples, one or both of the driver position processor(s) 106 and the video processor(s) 108 store a coordinate system that maps the interior of the vehicle in three dimensions, including the coordinate positions of the displays 110, and the driver position sensor(s) 104. In examples, the coordinate system can then be used by the driver position processor(s) 106 and/or video processor(s) 108 to express and calculate the driver's position and any change in the driver's position relative to the display(s) 110.

In other examples, the driver position processor(s) 106 and/or the video processor(s) 108 may determine whether the driver position has moved relative to one or more preconfigured setpoints. In examples, the setpoints may relate to preconfigured positions of the driver relative to a display 110, such as a neutral point and one or more limit points (e.g., a closest/forwardmost point, a farthest/backmost point, a leftmost point, a rightmost point, a highest point, and a lowest point). For instance, a neutral point may correspond to a position of the driver's head or eyes when the driver is in a neutral or normal position when operating the vehicle 100. As can be appreciated, the neutral point will vary based on the size of the driver, how the driver prefers to sit (e.g., upright or reclined), position their head, etc., when operating the vehicle 100. As discussed further herein, the neutral position may be configured during a setup phase for a particular driver in a vehicle. The limit points may correspond to various positions where the driver may position their head or eyes in relation to the display 110. For example, the limit points may correspond to various outside edges of a maximum FOV at which an external camera 102 is configured to capture images (e.g., a captured FOV). For example, as further discussed herein if the driver moves significantly to the driver's right, the displayed FOV will pan left until it reaches an outer edge of the captured FOV, after which point moving further in that direction will not change the displayed FOV.

In some examples, one or more thresholds may be configured by the driver in relation to the digital mirror system 103. For example, a threshold may correspond to a sensitivity level of how much an amount of driver movement corresponds to an amount of panning or zooming of captured images, where head motion that does not exceed the threshold may result in no display change. In some examples, the sensitivity level may be adjusted such that an amount of head motion correlating to display change can be adjusted (e.g., a 5 inch head motion on sensitivity setting 1 may result in a 10 degree angle panning, while the same 5 inch head motion on sensitivity setting 5 may result in a 20 degree angle panning). For instance, each measure head movement or degree of angle change could cause a certain amount of display change (e.g., pan or zoom in/out), which would mimic real life as much as possible. Other drivers may want to be able to move a certain amount without the display changing at all.

The setpoints and threshold settings may be stored in association with the driver or a driver profile of the driver. For instance, the driver profile may include various vehicle configurations that are used by the vehicle to adjust or otherwise customize settings of the vehicle 100 to the driver.

Figure 2:
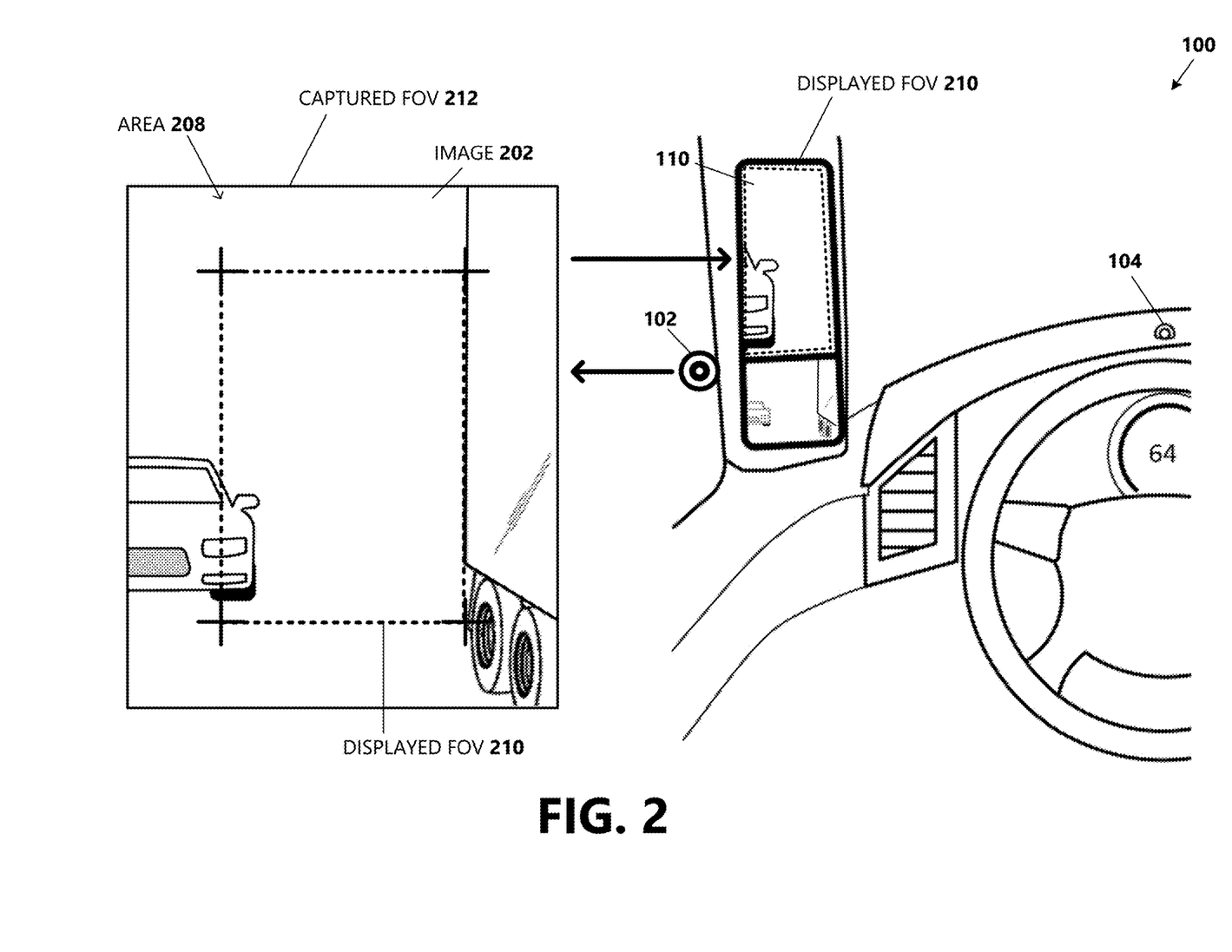
FIG. 2 is an illustration of fields of view captured and displayed by the auto-adjusting field of view digital mirror system according to an example.

According to examples, the video processor 108 is configured to receive images captured by the external camera(s) 102 and position information corresponding to the driver's current position from the driver position processor(s) 106 and determine a field of view (FOV) in which to display the images (i.e., a displayed FOV 210) based on the driver's current position. For instance, and as depicted in FIG. 2, an external camera 102 connected to the vehicle 100 may be configured to capture images, such as image 202 of an area 208 external to the vehicle 100. The external camera 102 may have a FOV at which it is able to capture images (i.e., a captured FOV 212), where the captured FOV 212 of the image 202 may be greater than the displayed FOV 210 of the image 202. For instance, a display 110 associated with the external camera 102 may be configured to display at least a portion of the area 208 of the image 202. The video processor 108, for example, is operative to determine a portion of the image 202 as the displayed FOV 210, where the displayed FOV 210 is determined based on the position (e.g., head position, eye position, or another position metric) of the driver in relation to the display 110. The determined displayed FOV 210 is communicated to the display 110 for presentation on the display 110 to provide a user experience that emulates a user experience with a traditional reflective mirror.

In some examples, as the driver moves their head while driving the vehicle 100, the video processor 108 may receive updated position information corresponding to the driver's current position. Based on the updated position information, the video processor 108 may crop, zoom in or out of, and/or pan received images 202 to select the determined displayed FOV 210, which is provided to the display 110 for display to the driver for providing an emulation of a traditional reflective mirror user experience with the additional benefits of digital mirrors. In examples, the distance of the driver from the display controls a zoom characteristic of the displayed FOV 210 versus the captured FOV 212, while an angle of the driver relative to the display 110 controls a panning (left, right, up, or down) of the displayed FOV 210 within the captured FOV 212. FIGS. 3A-3F illustrate various example FOVs that may be captured and displayed by the auto-adjusting FOV digital mirror system 103 according to an example.

Figures 3A, 3B:
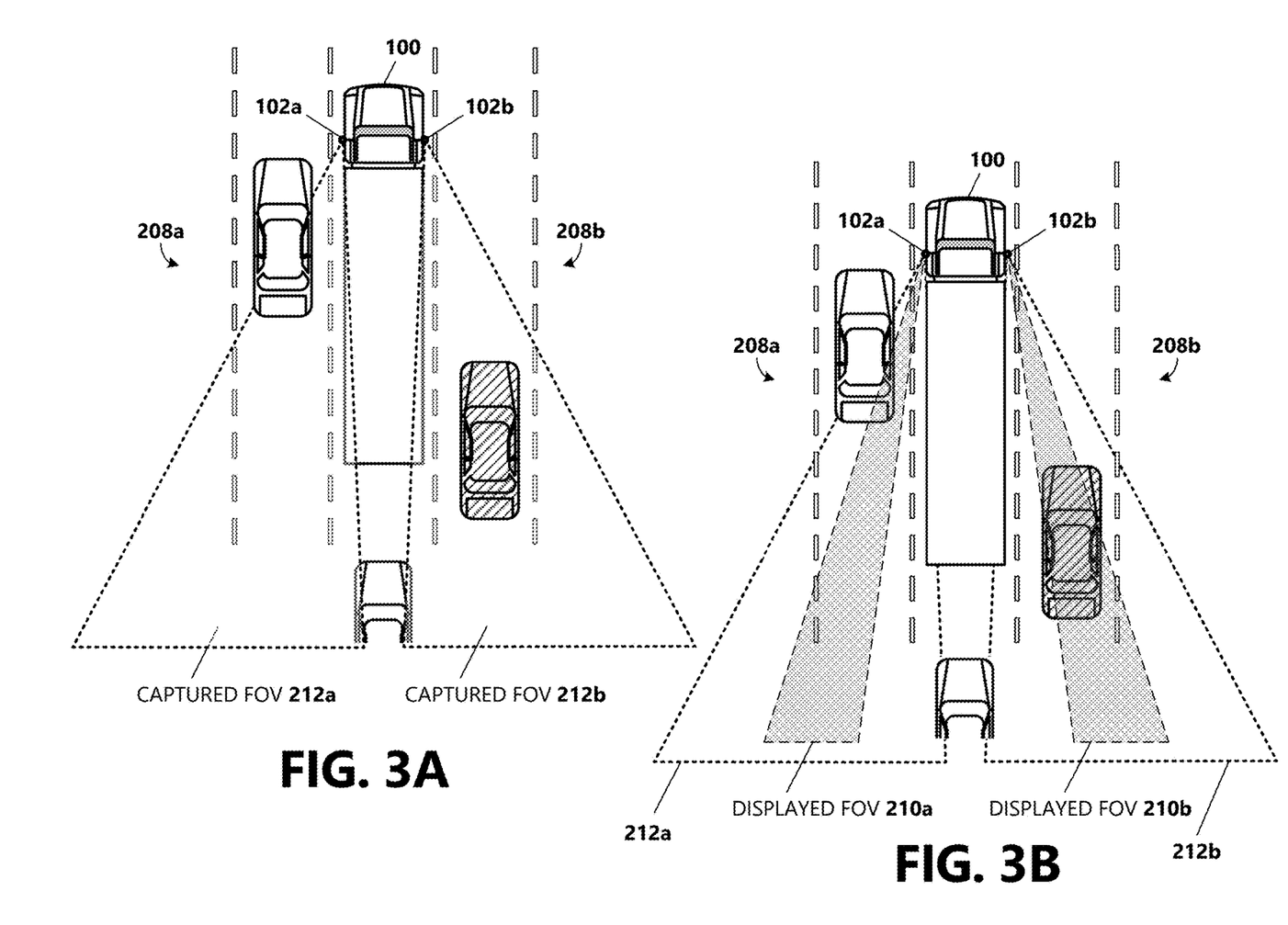
FIGS. 3A-3F are illustrations of various fields of view that may be captured and displayed by the auto-adjusting field of view digital mirror system according to an example.

With reference now to FIG. 3A, a first external camera 102a may capture images of a first area 208a external a vehicle 100 and a second external camera 102b may capture images of a second area 208b external the vehicle 100. For instance, the images captured of the first area 208a may have a first captured FOV 212a (represented by a dotted line) and the images captured of the second area 208b may have a second captured FOV 212b (also represented by a dotted line). For instance and as depicted, various potential hazards, such as other vehicles, may be included in the first captured FOV 212a and the second captured FOV 212b. In some examples, potential hazards may be included in a blind spot or occluded area of the vehicle 100. For example, typical blind spots for a tractor include an area located at the driver's side and a passenger side and direct rear of the vehicle 100 caused by the A pillars, the B pillars, the sleeper section, the trailer 114, or other structure of the vehicle 100.

With reference now to FIG. 3B, a first displayed FOV 210a and a second displayed FOV 210b are depicted (represented by a dashed line), where the first displayed FOV 210a corresponds to a first display 110a and the second displayed FOV 210b corresponds to a second display 110b. The first display 110a, for example, may be located interior the vehicle 100 proximate the first external camera 102a, and the second display 110b may be located interior the vehicle 100 proximate the second external camera 102b. According to examples, the first displayed FOV 210a and the second displayed FOV 210b are determined based on a first position of the driver of the vehicle 100. The first displayed FOV 210a and the second displayed FOV 210b may include a portion of the first captured FOV 212a and the second captured FOV 212b, respectively.

Figure 3C:
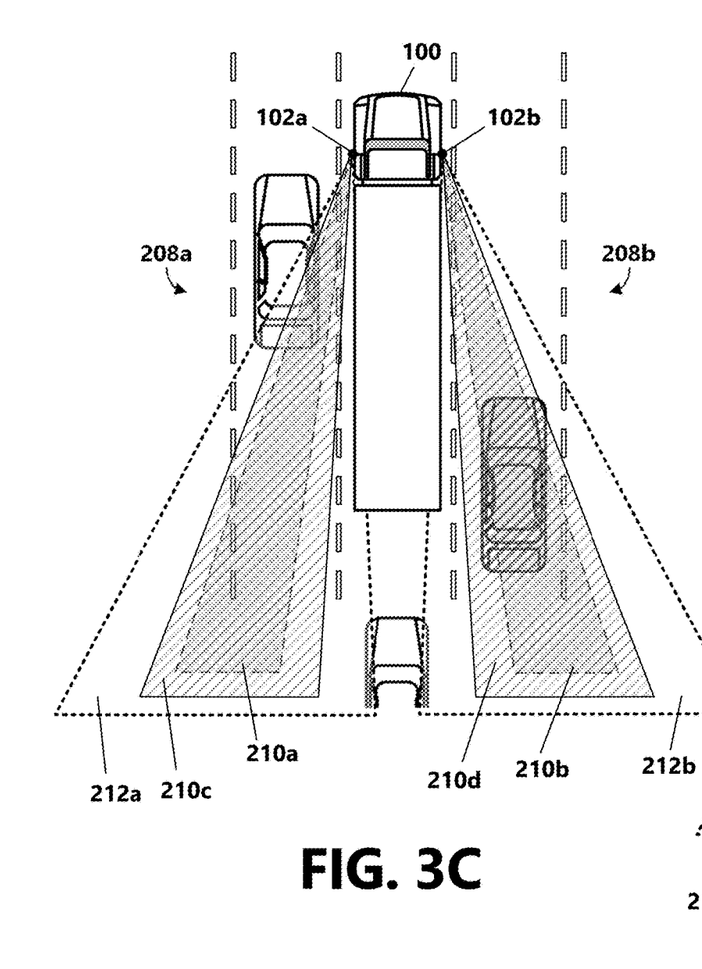

With reference now to FIG. 3C, as the driver moves their head closer to the first display 110a or the second display 110b, the size of the first displayed FOV 210a or the second displayed FOV 210b may increase. For instance, the video processor 108 may zoom out from the first displayed FOV 210a or the second displayed FOV 210b and determine an updated FOV (e.g., a third displayed FOV 210c or a fourth displayed FOV 210d) of images provided by the first external camera 102a or the second external camera 102b for display on the first display 110a or the second display 110b, respectively, based on the driver's head movement. The updated displayed FOVs 210 (e.g., the third displayed FOV 210c and the fourth displayed FOV 210d) are represented by a solid line and diagonal hatching.

Figure 3D:
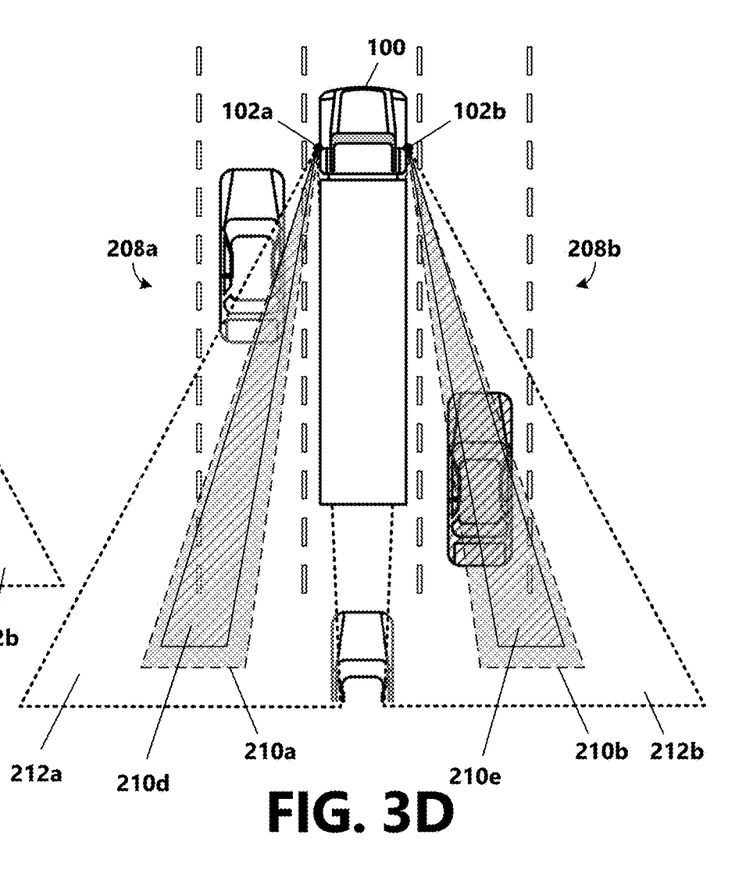

Alternatively, and as depicted in FIG. 3D, as the driver moves their head farther from the first display 110a or the second display 110b, the size of the displayed FOV 210a or the second displayed FOV 210b may decrease. For instance, the video processor 108 may zoom in on the first displayed FOV 210a or the second displayed FOV 210b and determine an updated FOV (e.g., a fourth displayed FOV 210e or a fifth displayed FOV 210f) of images provided by the first external camera 102a or the second external camera 102b for display on the first display 110a or the second display 110b, respectively, based on the driver's head movement.

Figure 3E:
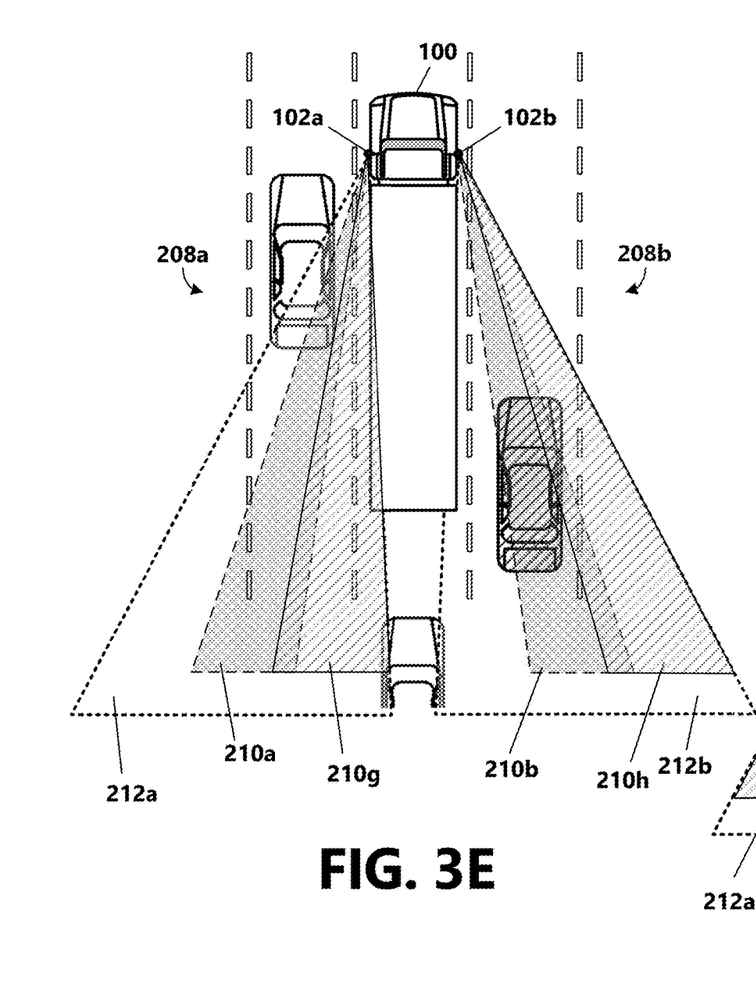

As another example, and as depicted in FIG. 3E, as the driver moves their head to the left in relation to the first display 110a or the second display 110b, the displayed FOV 210a or the second displayed FOV 210b may move to the right. For instance, the video processor 108 may move/pan the first displayed FOV 210a or the second displayed FOV 210b toward a right side of the captured FOVs 212 and determine an updated FOV (e.g., a sixth displayed FOV 210g or a seventh displayed FOV 210h) of images 202 provided by the first external camera 102a or the second external camera 102b for display on the first display 110a or the second display 110b, respectively, based on the driver's head movement.

Figure 3F:
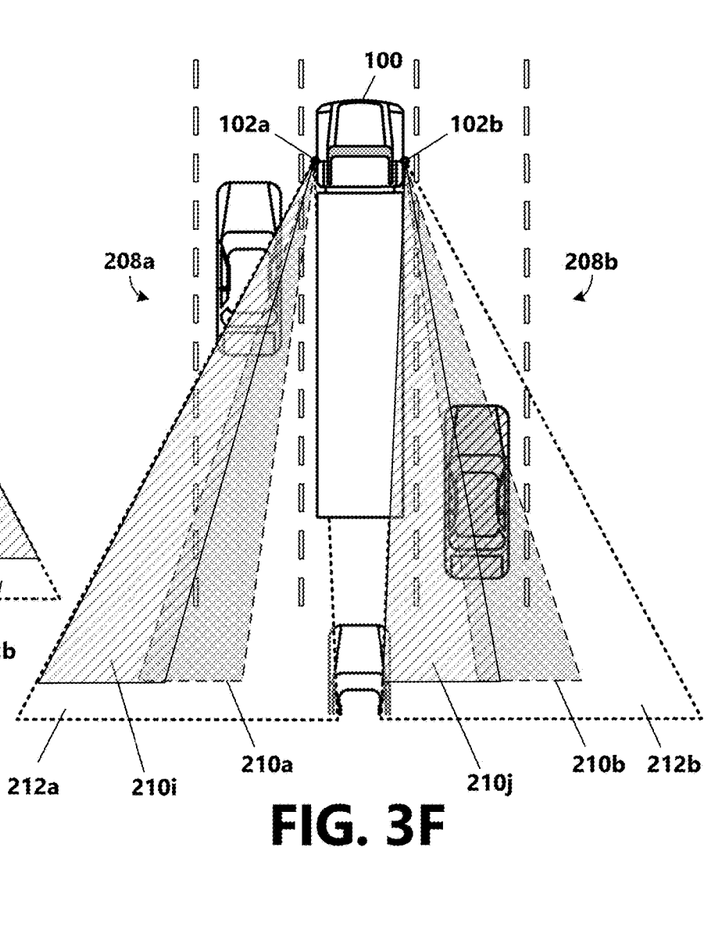

Alternatively, and as depicted in FIG. 3F, as the driver moves their head to the right, in relation to the first display 110a or the second display 110b, the displayed FOV 210a or the second displayed FOV 210b may move to the left. For instance, the video processor 108 may move/pan the first displayed FOV 210a or the second displayed FOV 210b toward a left side of the captured FOVs 212 and determine an updated FOV (e.g., an eighth displayed FOV 210i or a ninth displayed FOV 210j) of images 202 provided by the first external camera 102a or the second external camera 102b for display on the first display 110a or the second display 110b, respectively, based on the driver's head movement.

As another example, as the driver moves their head upward in relation to the first display 110a or the second display 110b, the updated displayed FOV 210 may move downward. Alternatively, as the driver moves their head downward in relation to the first display 110a or the second display 110b, the updated displayed FOV 210 may move upward. As can be appreciated, in other examples, the updated displayed FOV 210 may be determined based on a combination of two or more of the above driver movements (e.g., the driver may move their head toward the display 110 and to the right of the display 110), and the video processor 108 may determine the updated displayed FOV 210 based on the current position of the driver.

In some implementations, an external camera 102 may be configured to move in response to movement of the driver's head or eyes in relation to a display 110. For instance, the captured FOV 212 and the displayed FOV 210 may comprise a same image (e.g., include a same area 208 captured by the external camera 102), and the external camera 102 may move to capture different areas 208 based on the position (e.g., distance and angle) of the driver to the display 110.

Figure 4:
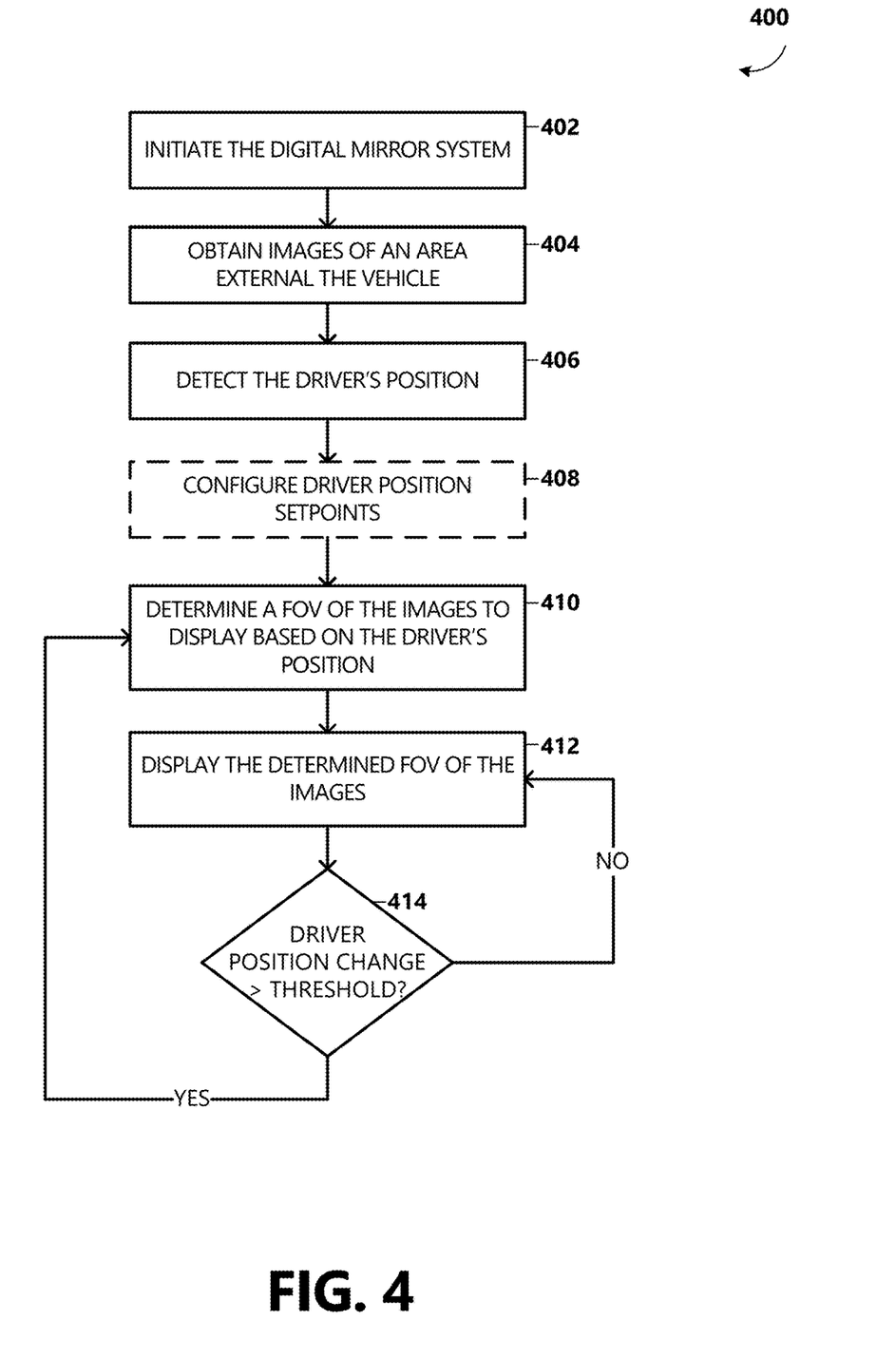
FIG. 4 is a flow diagram illustrating processing steps of a method that can be used to automatically adjust a displayed field of view based on a determined position of a driver of the vehicle according to an example.

With reference now to FIG. 4, a flow diagram is provided illustrating example processing steps of a method 400 that can be used to automatically adjust the displayed FOV 210 of a digital mirror according to an example. For instance, operations included in the method 400 may be performed by components of the auto-adjusting FOV digital mirror system 103. The method 400 starts at operation 402, where the auto-adjusting FOV digital mirror system 103 is initiated. For instance, the system 103 may be initiated upon starting the vehicle 100 or a selection made by a driver of the vehicle 100 to use the auto-adjusting FOV digital mirror system 103.

At operation 404, images 202 of one or more areas 208 exterior to the vehicle 100 may be captured by one or more external cameras 102. For instance, each external camera 102 may capture images of different areas 208 around the vehicle 100 that may normally be reflected in one or more reflective mirrors included in the vehicle 100, such as side view mirrors and/or, in some examples, a rearview mirror. In some examples, a portion of areas 208 captured by two different external cameras 102 may overlap. In some examples, images 202 of two or more areas 208 exterior to the vehicle 100 captured by two or more external cameras 102 may be stitched together to create a displayed FOV 210 that no one external camera 102 has but would be possible if a reflective mirror, in the place of the display 110, were not occluded. Images captured by the external cameras 102 may be transmitted to the video processor 108 for selecting a FOV (displayed FOV 210) of the images 202 to display on a corresponding display 110.

At operation 406, the driver's position may be detected. For example, the driver position sensor(s) 104 may detect a position corresponding to the driver's head, eyes, or another anatomical feature of the driver and provide associated driver position information to the driver position processor(s) 106 for determining a position and monitoring movement of the driver.

At optional operation 408, one or more driver position setpoints and, in some examples, thresholds may be configured. For example, the driver may go through a setup process where the driver's position at one or various positions in relation to a display 110 may be determined and stored. In some examples, the setpoints relate to a neutral position and one or more limit points (e.g., a closest/forwardmost point, a farthest/backmost point, a leftmost point, a rightmost point, a highest point, and a lowest point). As described above, a neutral point may correspond to a position of the driver's head or eyes when the driver is in a neutral or normal position when operating the vehicle 100. The neutral point will vary based on the size of the driver, how the driver prefers to sit (e.g., upright or reclined), position their head, etc., when operating the vehicle 100.

The setpoints may be associated with different portions of the areas 208 captured by the external cameras 102. Some limit points may correspond to various outside edges of a maximum FOV at which an external camera 102 is configured to capture images 202 (e.g., a captured FOV 212). For example, the closest/forwardmost driver position limit point may correspond to the maximum-zoomed FOV at which an external camera 102 is configured to capture images 202; the leftmost driver position limit point may correspond to a portion including the right edge of the captured FOV 212; the rightmost driver position limit point may correspond to a portion including the left edge of the captured FOV 212; the highest driver position limit point may correspond to a portion including the bottom edge of the capture FOV 212; and the lowest driver position limit point may correspond to a portion including the top edge of the captured FOV 212.

For example, any further movement in a direction past the driver position limit points will not result in change of the displayed FOV 210 because the displayed FOV 210 is already at an edge of the captured FOV 212.

In some examples, the driver may further set thresholds for movement (e.g., how much the captured FOV 212 will pan or zoom based on head movement, how much head movement causes panning or zooming). In some examples, the driver may use one or more UI controls 112 (e.g., buttons, knobs, displayed options) to configure the setpoints and thresholds. In some examples, the setpoints and thresholds are stored in association with the driver (e.g., stored in a driver profile corresponding to the driver).

At operation 410, a FOV (displayed FOV 210) of the images 202 to display on a corresponding display 110 may be determined based on the driver's position. For example, the driver position processor(s) 106 may determine the driver's position based on the information received from the driver position sensors 104. In some examples, the driver's position may be determined in relation to one or more displays 110 (e.g., the driver's position in relation to a display 110 or in relation to a setpoint). In some examples, in determining the driver's position, the driver position processor(s) 106 and/or video processor 108 may determine a distance and/or angle of the driver's position in relation to the one or more displays 110. According to some examples, the determination may be based on the driver's position in relation to a distance from the setpoints (e.g., a neutral point for that driver) configured by the driver. In some examples, the driver position processor(s) 106 may provide position information corresponding to the driver's current position to the video processor 108. Based on the driver's current position, the video processor 108 may determine a corresponding FOV (displayed FOV 210) to display on each display 110.

In examples, one or both of the driver position processor(s) 106 and the video processor(s) 108 store a coordinate system that maps the interior of the vehicle in three dimensions, including the coordinate positions of the displays 110, and the driver position sensor(s) 104. In examples, the coordinate system can then be used by the driver position processor(s) 106 and/or video processor(s) 108 to express and calculate the driver's position and any change in the driver's position relative to the display(s) 110.

In examples, driver movement may affect the display FOV for each display 110 differently. For example, if the driver's position is forward from a neutral setpoint (e.g., closer to the vehicle's windshield), that change in position may be farther right relative to a first display (e.g., a left-side mirror display) and farther left relative to a second display (e.g., a right-side mirror display). Accordingly, the display FOV of the left-side mirror display FOV may need to pan left within the captured FOV for that display, while the right-side mirror display FOV may need to pan right within the captured FOV for that display. In examples, the captured FOV for each display 110 may be different as well.

At operation 412, the determined displayed FOVs 210 may be communicated to and displayed by the displays 110. For example, each display 110 may present a portion of the images 202 captured by the corresponding external cameras 102.

At decision operation 414, a determination may be made as to whether the driver's position has changed from a previously reported position. For example, the driver position may be monitored by the driver position processor(s) 106, where the driver position processor(s) 106 may determine whether the driver's current position has moved from a previous position or setpoint by more than a threshold amount.

When a determination is made that the driver position has not changed (or not changed by at least a threshold amount), the method 400 may return to operation 412 where the current FOV may continue to be displayed as video is still being received from the vehicle camera(s). Alternatively, when a determination is made that the driver position has moved (e.g., by at least a threshold amount), the method 400 may return to operation 410, where an updated FOV (displayed FOV 210) of the images 202 may be determined based on the driver's current position and then displayed at operation 412.

For instance, in determining the displayed FOV 210, the video processor 108 may determine an amount to pan and/or zoom the captured FOV 212 based on the driver's position. In some examples, the driver position processor(s) 106 may provide the driver's new position according to coordinates defined by the stored coordinate system, and the video processor(s) 108 may determine whether the driver has moved by at least a threshold amount to require a change in displayed FOV. In other examples, the driver position processor(s) 106 may report a delta change in position from a previously reported position. For example, the driver position processor(s) 106 may report a change in driver position in three dimensions relative to one or more particular display(s) 110. In examples, the driver position processor(s) 106 may report lateral movement (e.g., changes in two dimensions in a plane parallel to the display plane) and movement in a direction perpendicular to the display plane. Other coordinate systems or methods of determining changes in driver position relative to display(s) 110 are possible and contemplated. In other examples, the current coordinates determined by the driver position processor(s) 106 are simply reported to the video processor(s) 108, which then determine a change from any previously reported driver position(s). Further, the video processor(s) 108 may then use the driver position information to determine the displayed FOV (upon return to operation 410). For instance, in relation to a previous position of the driver, in determining a current position of the driver is farther in a first direction lateral to the digital mirror display than the previous position (e.g., to the right), the video processor(s) 108 may pan a previously displayed FOV 210 a corresponding amount in a second direction that is opposite the first direction so that an updated displayed FOV 210 includes a portion of the captured FOV 212 farther in the second direction (e.g., left) than the previously displayed FOV 210. Similarly, if the driver's updated position is closer to or further away from a particular display 110, then the displayed FOV for that display be zoomed in or out, accordingly. As such, the displayed FOV 210 may update based on the driver's current position.

Figure 5:
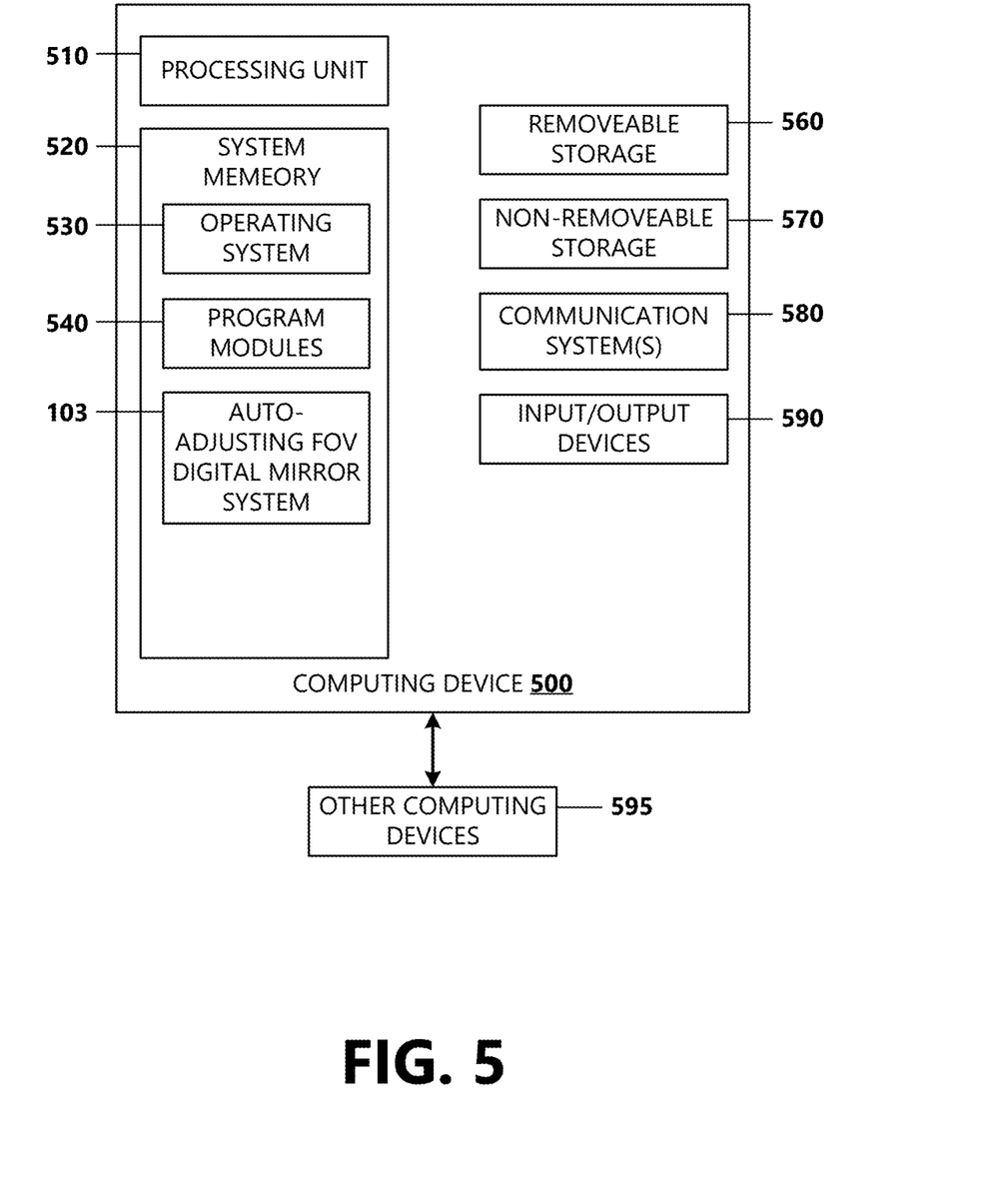
FIG. 5 is a block diagram illustrating example physical components of a computing device or system with which examples may be practiced.

FIG. 5 is a system diagram of a computing device 500 according to an example. The computing device 500, or various components and systems of the computing device 500, may be integrated or associated with one or more of the devices or systems described above. As shown in FIG. 5, the physical components (e.g., hardware) of the computing device 500 are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. A number of different program modules and data files may be stored in the system memory 520. While executing on the processing unit 510, the program modules 540 may perform the various processes described above. In one example, the program modules 640 include the auto-adjusting FOV digital mirror system 103.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 595, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

I claim:

1. A method, comprising:
   obtaining images of an area exterior a vehicle, wherein the images depict a captured field of view (FOV) having a left edge, a right edge, a top edge, and a bottom edge and wherein the left edge, the right edge, the top edge, and the bottom edge are outside edges of a maximum FOV at which an external camera is configured to capture the images;
   detecting a current position of a driver of the vehicle, wherein the current position comprises a first position;
   determining a first displayed FOV at which to display the images based on the first position;
   displaying the first displayed FOV of the images on a digital mirror display, wherein the first displayed FOV is a portion of the captured FOV;
   determining that the current position has changed to a second position, wherein determining that the current position has changed to the second position comprises determining the current position relative to a position limit point corresponding to at least one of: the left edge of the captured FOV; the right edge of the captured FOV; the top edge of the captured FOV; or the bottom edge of the captured FOV;
   determining a second displayed FOV at which to display the images based on the second position; and
   displaying the second displayed FOV of the images on the digital mirror display, wherein the second displayed FOV is a different portion of the captured FOV than the first displayed FOV.

2. The method of claim 1, wherein detecting the current position of the driver comprises detecting the current position of the driver's head or eyes.

3. The method of claim 1, wherein determining the second displayed FOV at which to display the images comprises:
   determining the second position is closer to the digital mirror display than the first position; and
   zooming out from the first displayed FOV a corresponding amount so that the second displayed FOV includes a greater portion of the captured FOV than the first displayed FOV.

4. The method of claim 1, wherein determining the second displayed FOV at which to display the images comprises:
   determining the second position is farther from the digital mirror display than the first position; and
   zooming in on the second FOV a corresponding amount so that the second displayed FOV includes a smaller portion of the captured FOV than the first displayed FOV.

5. The method of claim 1, wherein determining the second displayed FOV at which to display the images comprises:
   determining the second position is farther in a first direction lateral to the digital mirror display than the first position; and
   panning the second FOV a corresponding amount in a second direction that is opposite the first direction so that the second displayed FOV includes a portion of the captured FOV farther in the second direction than the first displayed FOV.

6. The method of claim 1, wherein determining the current position has changed comprises determining the current position has changed by more than a threshold amount, wherein the first displayed FOV is displayed until the current position has changed by at least the threshold amount.

7. An auto-adjusting field of view (FOV) digital mirror system, comprising:
   at least one processor; and
   a memory including instructions, which when executed by the processor, cause the system to:
      obtain images of an area exterior a vehicle, wherein the images depict a captured field of view (FOV) having a left edge, a right edge, a top edge, and a bottom edge and wherein the left edge, the right edge, the top edge, and the bottom edge are outside edges of a maximum FOV at which an external camera is configured to capture the images;
      detect a current position of a driver of the vehicle, wherein the current position comprises a first position;
      determine a first displayed FOV at which to display the images based on the first position;
      display the first displayed FOV of the images on a digital mirror display, wherein the first displayed FOV is a portion of the captured FOV;
      determine that the current position has changed to a second position, wherein determining that the current position has changed to the second position comprises determining the current position relative to a position limit point corresponding to at least one of: the left edge of the captured FOV; the right edge of the captured FOV; the top edge of the captured FOV; or the bottom edge of the captured FOV;
      determine a second displayed FOV at which to display the images based on the second position; and
      display the second displayed FOV of the images on the digital mirror display, wherein the second displayed FOV is a different portion of the captured FOV than the first displayed FOV.

8. The system of claim 7, wherein the system comprises one or more driver position sensors to detect the current position of the driver's head or eyes.

9. The system of claim 7, wherein in determining the second displayed FOV at which to display the images, the instructions cause a video processor of the system to perform one of:
   determine the second position is closer to the digital mirror display than the first position; and
      zoom out from the first displayed FOV a corresponding amount so that the second displayed FOV includes a greater portion of the captured FOV than the first displayed FOV; or
   determine the second position is farther from the digital mirror display than the first position; and zoom in on the second FOV a corresponding amount so that the second displayed FOV includes a smaller portion of the captured FOV than the first displayed FOV.

10. The system of claim 7, wherein in determining the second displayed FOV at which to display the images, the instructions cause a video processor of the system to perform one of:
   determine the second position is farther in a first direction lateral to the digital mirror display than the first position; and
   pan the second FOV a corresponding amount in a second direction that is opposite the first direction so that the second displayed FOV includes a portion of the captured FOV farther in the second direction than the first displayed FOV.

11. A vehicle, comprising an auto-adjusting field of view (FOV) digital mirror system, comprising:
   at least one processor; and
   a memory including instructions, which when executed by the processor, cause the system to:
      obtain images of an area exterior a vehicle, wherein the images depict a captured field of view (FOV) having a left edge, a right edge, a top edge, and a bottom edge and wherein the left edge, the right edge, the top edge, and the bottom edge are outside edges of a maximum FOV at which an external camera is configured to capture the images;
      detect a current position of a driver of the vehicle, wherein the current position comprises a first position;
      determine a first displayed FOV at which to display the images based on the first position;
      display the first displayed FOV of the images on a digital mirror display, wherein the first displayed FOV is a portion of the captured FOV;
      determine that the current position has changed to a second position, wherein determining that the current position has changed to the second position comprises determining the current position relative to a position limit point corresponding to at least one of: the left edge of the captured FOV; the right edge of the captured FOV; the top edge of the captured FOV; or the bottom edge of the captured FOV;
      determine a second displayed FOV at which to display the images based on the second position; and
      display the second displayed FOV of the images on the digital mirror display, wherein the second displayed FOV is a different portion of the captured FOV than the first displayed FOV.

12. The vehicle of claim 11, wherein in determining the second displayed FOV at which to display the images, the instructions cause a video processor of the system to perform at least one of:
   determine the second position is closer to the digital mirror display than the first position; and
   zoom out from the first displayed FOV a corresponding amount so that the second displayed FOV includes a greater portion of the captured FOV than the first displayed FOV;
   determine the second position is farther from the digital mirror display than the first position; and
   zoom in on the second FOV a corresponding amount so that the second displayed FOV includes a smaller portion of the captured FOV than the first displayed FOV; and
   determine the second position is farther in a first direction lateral to the digital mirror display than the first position; or
   pan the second FOV a corresponding amount in a second direction that is opposite the first direction so that the second displayed FOV includes a portion of the captured FOV farther in the second direction than the first displayed FOV.

* * * * *